Feb. 14, 1950   C. MEISSNER   2,497,554
FLATFISH FILLETING MACHINE
Filed July 23, 1945   4 Sheets-Sheet 1

INVENTOR
CHARLES MEISSNER
By A.B.Bowman
ATTORNEY

Feb. 14, 1950

C. MEISSNER 2,497,554

FLATFISH FILLETING MACHINE

Filed July 23, 1945

4 Sheets-Sheet 4

INVENTOR.
CHARLES MEISSNER
BY
A.B.Bowman
ATTORNEY

Patented Feb. 14, 1950

2,497,554

UNITED STATES PATENT OFFICE 2,497,554

FLATFISH FILLETING MACHINE

Charles Meissner, San Diego, Calif.

Application July 23, 1945, Serial No. 606,681

13 Claims. (Cl. 17—4)

My invention relates to a flatfish slicing machine, more particularly for use in filleting flatfish such as halibut, or the like, and the objects of my invention are:

First, to provide a machine of this class which readily removes the meat from the bone of flatfish providing meat fillets for food;

Second, to provide a machine of this class which is particularly adapted for use in producing large quantities of fillets from flatfish;

Third, to provide a machine of this class which is automatically adjustable for the combination of fish varying in size;

Fourth, to provide a machine of this class which is capable of filleting flatfish as rapidly as the fish can be conveyed thereto;

Fifth, to provide a machine of this class having novel automatically and angularly adjustable knives which rotate at high speed providing cutting means which readily conform to the outer surfaces of the fish bone;

Sixth, to provide a machine of this class which neatly quarters the fish providing four filleted sections with a minimum weight of meat left on the bone; and Seventh, to provide a machine of this class which is very simple and economical of construction in accordance with its utility and which will not readily deteriorate or get out of order.

Figure 1:
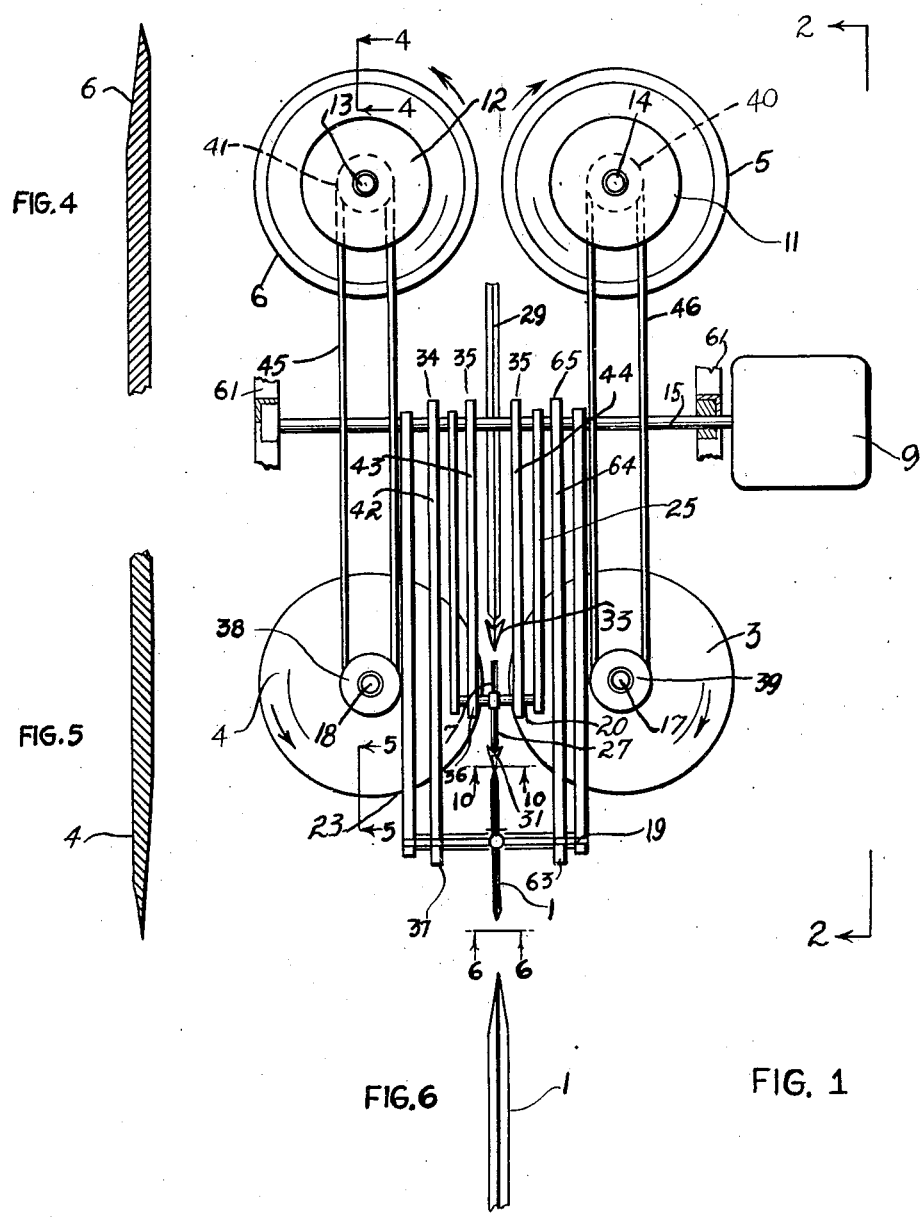
Figure 2:
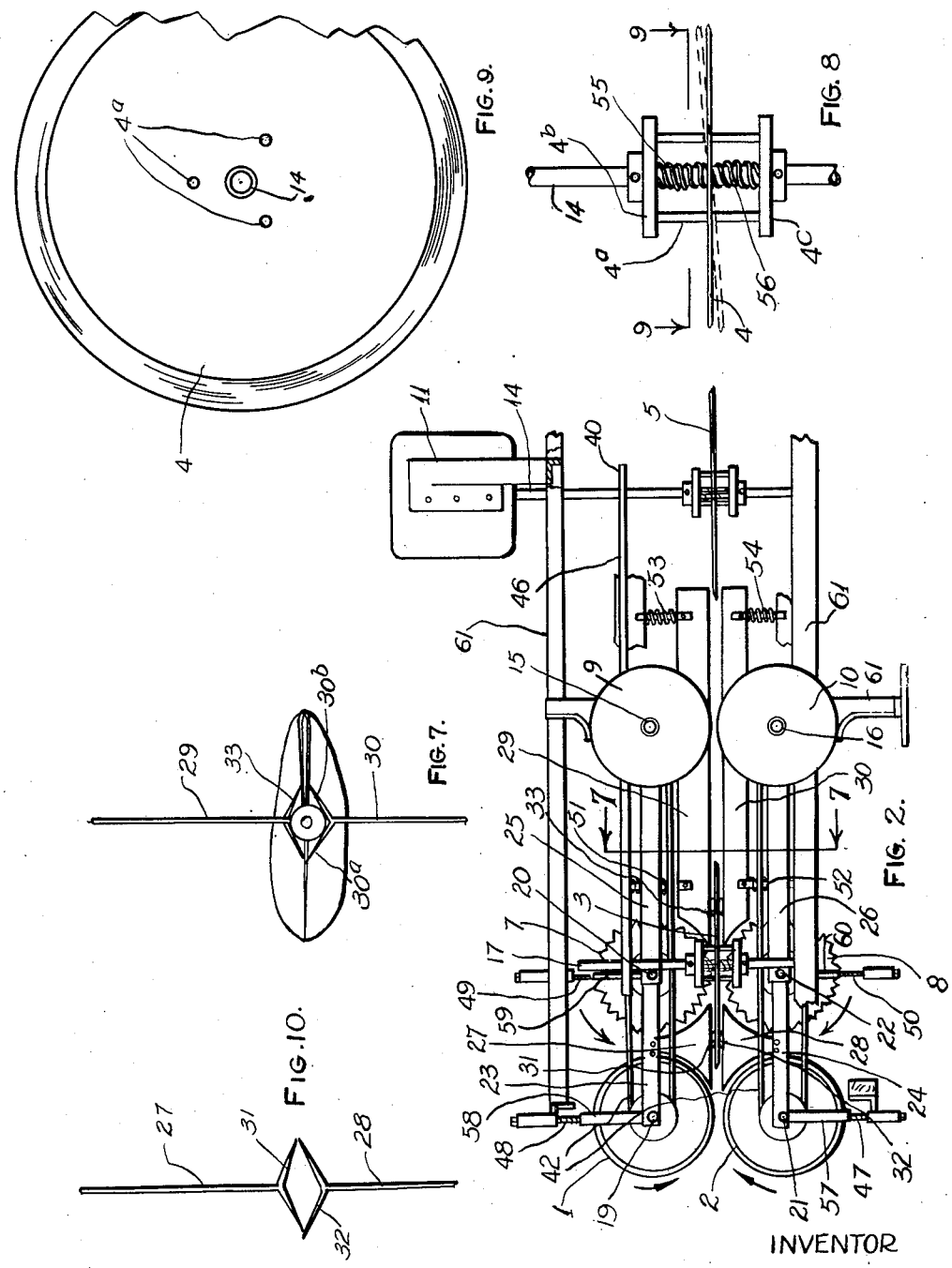
Figure 3:
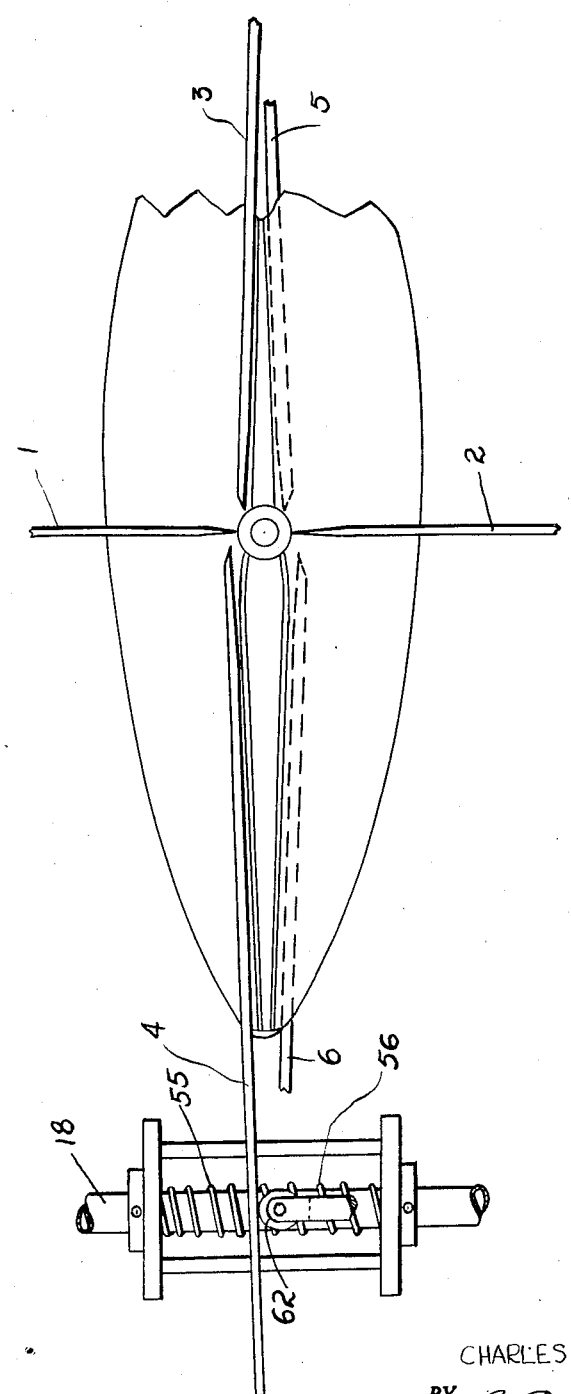
Figure 11:
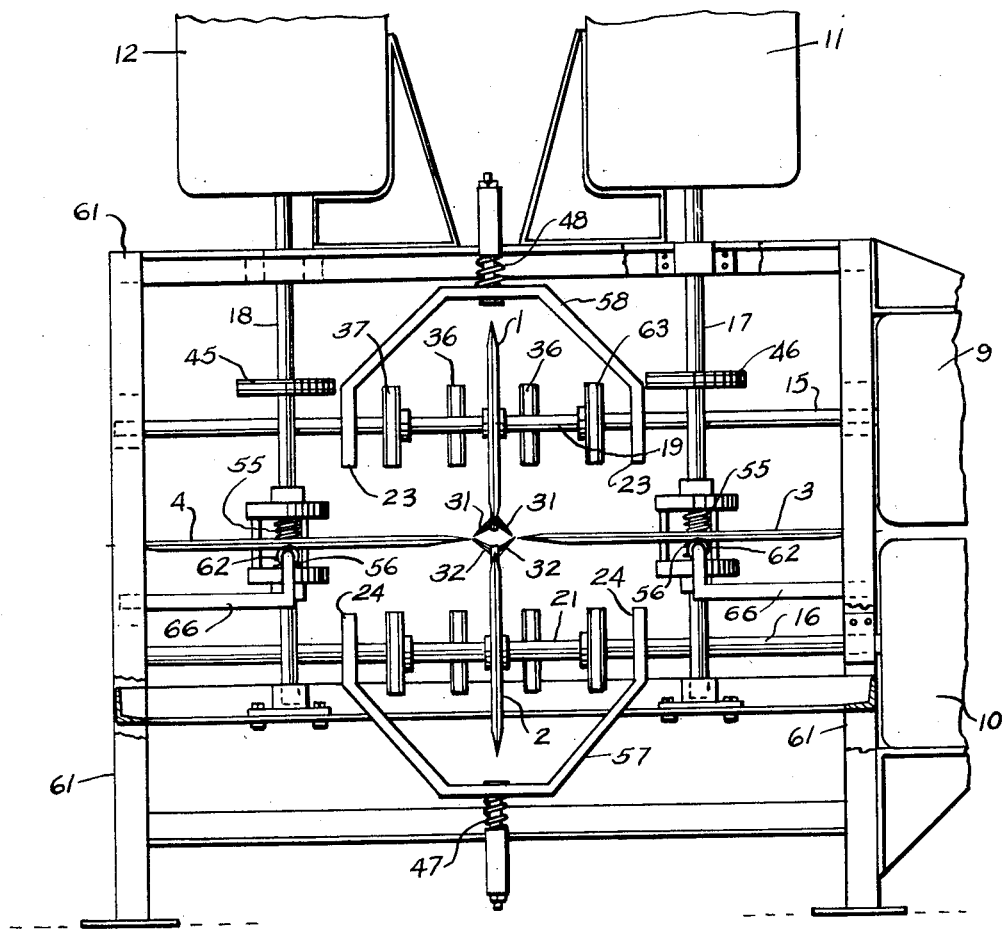

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is a top or plan view of my fish slicing machine showing portions thereof broken away and parts of the frame omitted to facilitate the illustration; Fig. 2 is a side elevational view thereof taken from the line 2—2 of Fig. 1 showing portions broken away and omitted to facilitate the illustration; Fig. 3 is an enlarged fragmentary view of the circular cutting knives of my fish slicing machine shown in relation to the cross section of a flatfish; Fig. 4 is an enlarged fragmentary view taken from the line 4—4 of Fig. 1; Fig. 5 is a similar view taken from the line 5—5 of Fig. 1; Fig. 6 is an enlarged fragmentary elevational view taken from the line 6—6 of Fig. 1; Fig. 7 is an enlarged sectional view taken from the line 7—7 of Fig. 2; Fig. 8 is an enlarged fragmentary view of one of the circular knives of my fish slicing machine showing the supporting mechanism thereof together with a dash line position of the knife indicating the flexible mounting thereof; Fig. 9 is a sectional view taken from the line 9—9 of Fig. 8; Fig. 10 is an enlarged sectional view taken from the line 10—10 of Fig. 1 and Fig. 11 is an enlarged view of my flatfish slicing machine.

Similar characters of reference refer to similar parts and portions throughout the several views of the drawings:

The circular knives 1, 2, 3, 4, 5 and 6, fish driving wheels 7 and 8, motors 9, 10, 11 and 12, shafts 13, 14, 15, 16, 17, 18, 19, 20, 21 and 22, levers 23, 24, 25 and 26, guides 27, 28, 29 and 30, parting knives 31, 32, and 33, pulleys 34, 35, 36, 37, 38, 39, 40, and 41, belts 42, 43, 44, 45 and 46, springs 47, 48, 49, 50, 51, 52, 53, 54, 55, and 56, and the yokes 57, 58, 59, and 60 constitute the principal parts and portions of my fish slicing machine.

The circular knives 1 and 2 are rotatably mounted in connection with the shafts 19 and 21 respectively. The circular knife 1 is directly above the circular knife 2 and maintained in close spaced relation therewith. As shown in Fig. 1 of the drawings these knives 1 and 2 are in direct vertical alignment and are supported in connection with the shaft 19 by means of the yokes 57 and 58 which are resiliently supported by springs 47 and 48 in connection with the frame 61 of my fish slicing machine.

It will be here noted that these circular knives 1 and 2 are rotatably driven by means of the pulleys 37 and 63 engaged by the belts 42 and 64 operating over the pulleys 34 and 65 respectively on the shafts 15 and 16 supported by the frame 61 and driven by the motors 9 and 10.

The shafts 19 and 21 are pivotally mounted about the axes of the shafts 15 and 16 respectively. The levers 23 and 24 are mounted on the shafts 15 and 16 respectively in connection with the frame 61 and support the shafts 19 and 21 respectively. Thus, the circular knives 1 and 2 are rotated in synchronized relation with their respective shafts 15 and 16 and are pivotally movable about the axes of the shafts 15 and 16.

The circular knives 3, 4, 5 and 6 are substantially horizontal in disposition. The circular knives 3, 4, 5, and 6 are illustrated in Fig. 3 of the drawings wherein they are shown in relation to the cross section of a flatfish passing through my fish slicing machine. The bevel of the cutting edge of the knives 3 and 4 is substantially the cross sectional shape as shown in Fig. 5 of the drawings while the cutting edge of the circular knives 5 and 6 is substantially the cross sectional shape as shown in Fig. 4 of the drawings.

Supporting the lower sides of each of the knives 3, 4, 5 and 6 are rollers 62 which are stationarily revolubly mounted in connection with the brackets 66 secured to the frame 61.

As shown in Figs. 3 and 8 of the drawings these circular knives 3 to 6 inclusive are flexibly supported on central shafts and are driven by three vertically disposed pins 4a, as shown in Fig. 9 of the drawings in cross section and Fig. 8 of the drawings in elevation. These pins 4a pass vertically through each of these circular knives and permit the angular flexure of these knives relatively to the central shaft on which is mounted two disc-like members 4b and 4c which retain opposite ends of the pins 4a.

Positioned on opposite sides of the circular knife 4, as shown in Fig. 8 of the drawings are the springs 55 and 56 which tend to maintain the vertical disposition of the circular knives 3 to 6 inclusive, as shown best in Figs 8 and 9 of the drawings; also in Fig. 3 of the drawings. Each of the circular knives 3 to 6 inclusive is engaged by a spring 56 at its lower side and a spring 55 at its upper side.

The circular knives 5 and 6 are driven and supported directly on the shafts 14 and 13 of the motors 11 and 12 respectively.

Mounted on the shafts 13 and 14 of the motors 12 and 11 respectively are the pulleys 40 and 41 which engage the belts 45 and 46 passing over pulleys 38 and 39 on the shafts 17 and 18. These shafts 17 and 18 carry the circular knives 3 and 4 which are driven in substantially the same manner as shown in Fig. 8 of the drawings and hereinbefore described in connection therewith.

The fish driving wheels 7 and 8 are vertically disposed wheels substantially in the same plane as the circular knives 1 and 2 and the fish driving wheels 7 and 8 are provided with peripheral teeth portion, as shown in Fig. 2 of the drawings, for frictional engagement with fish passing through my fish slicing machine. These fish driving wheels 7 and 8 are mounted on shafts 20 and 22 respectively which are journalled in connection with levers 25 and 26 pivotally mounted on the axes of the shafts 15 and 16, all as shown best in Figs. 1 and 2 of the drawings.

The pulleys 35 in connection with the shafts 15 and 16 are engaged by belts 43 passing over the pulleys 36 in connection with the shafts 20 and 22. It will be noted that the yokes 59 and 60 are connected to the levers 25 and 26 and are supported in connection with the frame 61 by the springs 49 and 50 providing resilient support resisting the pivotal movement of the fish driving wheels 7 and 8 about the axes of the shafts 15 and 16.

The guides 27 and 28 are secured in connection with the levers 23 and 24 and are in alignment with the circular knives 1 and 2, as shown best in Fig. 1 of the drawings.

Supported on these guides 27 and 28 are the parting knives 31 and 32, shown in cross section in Fig. 10 of the drawings, and in the plan view in Fig. 1 of the drawings.

The guides 29 and 30 are positioned on opposite sides of the fish driving wheel from the guides 27 and 28. These guides 29 and 30 are resiliently supported in connection with the frame 61 by means of the springs 51, 52, 53, and 54 which resist the separation of these guides 29 and 30.

Carried on the guide 29 is the parting knife 33 which is shown in the cross sectional view Fig. 7, and the plan view, Fig. 1 of the drawings. This parting knife 33 is secured near the leading end of the guide 29 on its lower edge directly above the guide 30, which is provided with outwardly and angularly extending edge portions 30a and 30b forming a trough through which the backbone of the fish passes and in which it is guided during the slicing operation on the fish as it passes through my machine.

The operation of my fish slicing machine is substantially as follows: The fish to be sliced in my machine are decapitated so that the heads are eliminated before filleting operations are carried on in my fish slicing machine. The fish are then inserted between the knives 1 and 2 in substantially the relationship as shown in Fig. 3 of the drawings. The rotational direction of the knives 1 to 6 inclusive and the fish driving wheels 7 and 8 is indicated by arrows in Figs. 1 and 2 of the drawings. Thus it will be noted that the fish are carried by frictional engagement of the knives 1 and 2 toward the fish driving wheels 7 and 8. The knives 1 and 2 operate at relatively high speed and slice the fish down to the backbone on opposite sides. The circular knives 1 and 2 being resiliently mounted are forced by the springs 47 and 48 down to the backbone the engagement with which causes the fish to move into the fish driving wheels 7 and 8 which force the fish backwardly through the knives 3 and 4 toward the knives 5 and 6. The circular knives 3, 4, 5 and 6 are fixed in a certain position on the shafts 13, 14, 17 and 18, which are connected rigidly to the frame 61 of my fish slicing machine. However, as hereinbefore described in connection with Fig. 8 of the drawings, these circular knives 3 to 6 inclusive are tiltably shiftable as indicated by dash lines in Fig. 8 of the drawings, and by solid lines in Fig. 3 of the drawings. In passing the knives 3 and 4, as shown in Fig. 3 of the drawings, the upper side of the fish is sliced from the bones wherein the bevel of the circular knives 3 and 4 is illustrated in Fig. 4 of the drawings in cross section. This bevelled cutting edge provides smooth separation of the meat from the bones during passage of the fish between said knives 3 and 4. As the fish is conveyed backwardly toward the knives 5 and 6, the backbone of the fish is carried in the guide 30 between the angularly extending guide portions 30a and 30b, as shown in Fig. 7 of the drawings. It will be here noted, however, that the parting knives 31, 32 and 33 are particularly arranged to cut the meat of the fish away from the backbone at opposite sides thereof as this backbone, as shown in Fig. 7 of the drawings, enters the guide 30. The guides 29 and 30 are resiliently forced together providing engagement of the backbone at opposite sides for maintaining the fish in alignment with the circular knives 5 and 6 toward which the fish is moving at high speed. When the fish reaches the circular knives 5 and 6 the meat is parted from the bones on the opposite side from the knives 3 and 4, as shown in Fig. 3 of the drawings, whereupon the quartered fillet sections of the fish pass out of the machine and into proper receptacles, not shown in the drawings. The fish bones, together with entrails, and tail, are the waste products remaining after the quartered filleted portions have been removed by the knives 1 to 6 inclusive, and the parting knives 31 to 33 inclusive.

Though I have shown and described a particular construction, combination and arrangement of parts and portions, I do not wish to be limited to the particular construction, combination and arrangement, but desire to include in the scope of my invention the construction, combination and arrangement substantially as set forth in the appended claims.

Having thus described my invention, what I claim as new and desire to secure by Letters Patent is:

1. In a flatfish slicing machine, the combination of a pair of vertically disposed circular knives positioned in vertical alignment with each other having their edges in slight spaced relation, means resiliently tending to force said circular knives toward each other when in use, a second pair of circular knives horizontally disposed in slight spaced relation to each other, and resilient means engaging and supporting said second knives parallel to the rotating axis thereof permitting the angular deflection of said second circular knives axially of their axes.

2. In a flatfish slicing machine, the combination of a pair of vertically disposed circular knives positioned in vertical alignment with each other having their edges in slight spaced relation, means resiliently tending to force said circular knives toward each other when in use, a second pair of circular knives horizontally disposed in slight spaced relation to each other, resilient means engaging and supporting said second knives parallel to the rotating axis thereof permitting the angular deflection of said second circular knives axially of their axes, and a third pair of circular knives horizontally disposed and maintained in spaced relation to each other at their edges and positioned on an opposite side of said second mentioned circular knives from said first mentioned circular knife, said third pair of circular knives provided with resilient means engaging and supporting said second knives parallel to the rotating axis thereof permitting the angular deflection thereof at their edges in a direction longitudinally of their axis.

3. In a fish slicing machine of the class described, the combination of a pair of vertically disposed circular knives arranged in a common plane and spaced from each other at their edges, shafts for said circular knives, levers in which said shafts are journalled, driving motors having operating shafts in cooperative relation therewith on which said levers are pivotally mounted, pulleys on said first mentioned shaft and pulleys on said motor operated shaft and belts interconnecting pulleys on both of said shafts, said circular knives being vertically disposed and yoke means in connection with said levers and straddling said circular knives resilient means engaging said yokes and tending to force said circular knives toward each other.

4. In a fish slicing machine of the class described, the combination of a pair of vertically disposed circular knives arranged in a common plane and spaced from each other at their edges, shafts for said circular knives, levers in which said shafts are journalled, driving motors having operating shafts in cooperative relation therewith on which said levers are pivotally mounted, pulleys on said first mentioned shaft and pulleys on said motor operated shaft and belts interconnecting pulleys on both of said shafts, said circular knives being vertically disposed, yoke means in connection with said levers and straddling said circular knives resilient means engaging said yokes and tending to force said circular knives when in use toward each other, a pair of horizontally disposed circular knives having fixed axes, a plurality of pins extending through said vertically disposed circular knives about the axes of which said knives are freely shiftable providing angular freedom of said knives and their edges in a direction longitudinally of their axes and springs on opposite sides of said second mentioned circular knives tending to maintain said vertical circular knives in a vertical plane.

5. In a fish slicing machine of the class described, the combination of a pair of vertically disposed circular knives arranged in a common plane and spaced from each other at their edges, shafts for said circular knives, levers in which said shafts are journalled, driving motors having operating shafts in cooperative relation therewith on which said levers are pivotally mounted, pulleys on said first mentioned shaft and pulleys on said motor operated shaft and belts interconnecting pulleys on both of said shafts, said circular knives being vertically disposed and yoke means in connection with said levers and straddling said circular knives resilient means engaging said yokes and tending to force said circular knives toward each other, a pair of horizontally disposed circular knives having fixed axes, a plurality of pins extending through said vertically disposed circular knives about the axes of which said knives are freely shiftable providing angular freedom of said knives at their edges in a direction longitudinally of their axes, springs on opposite sides of said second mentioned circular knives tending to maintain said vertical circular knives in a vertical plane, a pair of fish driving wheels having notched teeth at their periphery revolubly operated in a plane with said vertically disposed circular knives and springs tending to force the same toward each other.

6. In a fish slicing machine of the class described, the combination of a pair of vertically disposed circular knives arranged in a common plane and spaced from each other at their edges, shafts for said circular knives, levers in which said shafts are journalled, driving motors having operating shafts in cooperative relation therewith on which said levers are pivotally mounted, pulleys on said first mentioned shaft and pulleys on said motor operated shaft and belts interconnecting pulleys on both of said shafts, said circular knives being vertically disposed and yoke means in connection with said levers and straddling said circular knives resilient means engaging said yokes and tending to force said circular knives toward each other, a pair of horizontally disposed circular knives having fixed axes, a plurality of pins extending through said vertically disposed circular knives about the axes of which said knives are freely shiftable providing angular freedom of said knives at their edges in a direction longitudinally of their axes and springs on opposite sides of said second mentioned circular knives tending to maintain said vertical circular knives in a vertical plane, a pair of fish driving wheels having notched teeth at their periphery revolubly operated in a plane with said vertically disposed circular knives and springs tending to force the same toward each other, a second pair of horizontally disposed circular knives having fixed axes, a plurality of drive pins about the axes of said second mentioned horizontal circular knives and parallel thereto upon which said second mentioned horizontal circular knives are freely shiftable permitting angular movement thereof and motors for revolubly operating all of said knives and said fish driving wheels.

7. In a fish slicing machine of the class described, the combination of a pair of vertically disposed circular knives arranged in a common plane and spaced from each other at their edges, shafts for said circular knives, levers in which said shafts are journalled, driving motors having operating shafts in cooperative relation therewith on which said levers are pivotally mounted, pulleys on said first mentioned shaft and pulleys on said motor operated shaft and belts interconnecting pulleys on both of said shafts, said circular knives being vertically disposed and yoke means in connection with said levers and straddling said circular knives resilient means engaging said yokes and tending to force said circular knives toward each other, a pair of horizontally disposed circular knives having fixed axes, a plurality of pins extending through said vertically disposed circular knives about the axes of which said knives are freely shiftable providing angular freedom of said knives at their edges in a direction longitudinally of their axes and springs on opposite sides of said second mentioned circular knives tending to maintain said vertical circular knives in a vertical plane, a pair of fish driving wheels having notched teeth at their periphery revolubly operated in a plane with said vertically disposed circular knives and springs tending to force the same toward each other, a second pair of horizontally disposed circular knives having fixed axes, a plurality of drive pins about the axes of said second mentioned horizontal circular knives and parallel thereto upon which said second mentioned horizontal circular knives are freely shiftable permitting angular movement thereof and motors for revolubly operating all of said knives and said fish driving wheels, and parting knives disposed in alignment with the edges of said horizontally disposed circular knives and said vertically disposed circular knives arranged in spaced relation to each other and adapted to cut at opposite sides of the backbone of a fish.

8. In a fish slicing machine of the class described, the combination of a pair of vertically disposed circular knives arranged in a common plane and spaced from each other at their edges, shafts for said circular knives, levers in which said shafts are journalled, driving motors having operating shafts in cooperative relation therewith on which said levers are pivotally mounted, pulleys on said first mentioned shaft and pulleys on said motor operated shaft and belts interconnecting pulleys on both of said shafts, said circular knives being vertically disposed and yoke means in connection with said levers and straddling said circular knives resilient means engaging said yokes and tending to force said circular knives toward each other, a pair of horizontally disposed circular knives having fixed axes, a plurality of pins extending through said vertically disposed circular knives about the axes of which said knives are freely shiftable providing angular freedom of said knives at their edges in a direction longitudinally of their axes and springs on opposite sides of said second mentioned circular knives tending to maintain said vertical circular knives in a vertical plane, a pair of fish driving wheels having notched teeth at their periphery revolubly operated in a plane with said vertically disposed circular knives and springs tending to force the same toward each other, a second pair of horizontally disposed circular knives having fixed axes, a plurality of drive pins about the axes of said second mentioned horizontal circular knives and parallel thereto upon which said second mentioned horizontal circular knives are freely shiftable permitting angular movement thereof, motors for revolubly operating all of said knives and said fish driving wheels, parting knives disposed in alignment with the edges of said horizontally disposed circular knives and said vertically disposed circular knives arranged in spaced relation to each other and adapted to cut at opposite sides of the backbone of a fish, and guides in vertical alignment with said vertically disposed circular knives and spring means tending to force the same toward each other.

9. In a fish slicing machine of the class described, the combination of a pair of vertically disposed circular knives arranged in a common plane and spaced from each other at their edges, shafts for said circular knives, levers in which said shafts are journalled, driving motors having operating shafts in cooperative relation therewith on which said levers are pivotally mounted, pulleys on said first mentioned shaft and pulleys on said motor operated shaft and belts interconnecting pulleys on both of said shafts, said circular knives being vertically disposed and yoke means in connection with said levers and straddling said circular knives resilient means engaging said yokes and tending to force said circular knives toward each other, a pair of horizontally disposed circular knives having fixed axes, a plurality of pins extending through said vertically disposed circular knives about the axes of which said knives are freely shiftable providing angular freedom of said knives at their edges in a direction longitudinally of their axes and springs on opposite sides of said second mentioned circular knives tending to maintain said vertical circular knives in a vertical plane, a pair of fish driving wheels having notched teeth at their periphery revolubly operated in a plane with said vertically disposed circular knives and springs tending to force the same toward each other, a second pair of horizontally disposed circular knives having fixed axes, a plurality of drive pins about the axes of said second mentioned horizontal circular knives and parallel thereto upon which said second mentioned horizontal circular knives are freely shiftable permitting angular movement thereof, motors for revolubly operating all of said knives and said fish driving wheels, parting knives disposed in alignment with the edges of said horizontally disposed circular knives and said vertically disposed circular knives arranged in spaced relation to each other and adapted to cut at opposite sides of the backbone of a fish, and guides in vertical alignment with said vertically disposed circular knives and spring means tending to force the same toward each other, one of said guides having upwardly and outwardly extending guide portions adapted to engage and guide the backbone of a fish when passing from said fish driving wheel toward said second mentioned horizontal circular knives.

10. In a flatfish slicing machine of the class described, the combination of a pair of circular knives horizontally disposed in slightly spaced relation to each other and yieldable means engaging and supporting said knives parallel to the rotating axis thereof permitting the angular deflection of said circular knives axially of their axes.

11. In a flatfish slicing machine of the class described, the combination of a pair of circular knives horizontally disposed in slightly spaced relation to each other, means engaging and supporting said knives parallel to the rotating axis thereof permitting the angular deflection of said circular knives axially of their axes, and means for preventing the deflection of said circular knives in the direction of the movement of the fish.

12. In a flatfish slicing machine of the class described, the combination of a pair of circular knives horizontally disposed in slight spaced relation to each other, a second pair of horizontal knives disposed in slight spaced relation from each other and backwardly of said first mentioned pair of circular knives and resilient means engaging and supporting said second knives parallel to the rotating axis thereof permitting the angular deflection of all of said circular knives axially of their axes.

13. In a flatfish slicing machine of the class described, a plurality of horizontally disposed circular knives, resilient means engaging and supporting said knives parallel to the rotating axis thereof permitting the angular deflection of said circular knives axially of their axes, the periphery of each of said circular knives being provided with a long taper on one side and a short taper on its opposite side.

CHARLES MEISSNER.

REFERENCES CITED

The following references are of record in the file of this patent:

UNITED STATES PATENTS

| Number | Name | Date |
| --- | --- | --- |
| 710,524 | Scott | Oct. 7, 1902 |
| 745,861 | Keller et al. | Dec. 1, 1903 |
| 753,722 | Manula et al. | Mar. 1, 1904 |
| 1,647,170 | Barry | Nov. 1, 1927 |
| 2,179,821 | Hunt | Nov. 14, 1939 |
| 2,230,281 | Bader et al. | Feb. 4, 1941 |

FOREIGN PATENTS

| Number | Country | Date |
| --- | --- | --- |
| 51,027 | Denmark | Dec. 16, 1935 |
| 558,913 | Great Britain | Jan. 27, 1944 |